United States Patent [19]

Reichl et al.

[11] Patent Number: 5,003,427
[45] Date of Patent: Mar. 26, 1991

[54] METAL ENCAPSULATED MULTI-PHASE HIGH VOLTAGE SWITCHING SYSTEM FILLED WITH COMPRESSED GAS

[75] Inventors: Erwin Reichl, Tegernheim; Werner Heinzelmann, Regensburg, both of Fed. Rep. of Germany

[73] Assignee: Sachsenwerk Aktiengesellschaft, Tegernheim, Fed. Rep. of Germany

[21] Appl. No.: 191,044

[22] Filed: May 6, 1988

[30] Foreign Application Priority Data

May 6, 1987 [DE] Fed. Rep. of Germany ....... 3715053

[51] Int. Cl.[5] ............................................. H02B 1/20
[52] U.S. Cl. .................................. 361/341; 361/335; 361/355; 361/361
[58] Field of Search ...................... 200/148 B, 148 F; 361/331-335, 341, 355, 361

[56] References Cited

U.S. PATENT DOCUMENTS

| | | | |
|---|---|---|---|
| 4,523,253 | 6/1985 | Grünberg et al. | 361/335 |
| 4,644,442 | 2/1987 | Ponsioen et al. | 361/341 |
| 4,658,329 | 4/1987 | Kamura et al. | 361/332 |
| 4,687,890 | 8/1987 | Yamamoto et al. | 200/148 R |
| 4,700,270 | 10/1987 | Munzinser et al. | 361/341 |
| 4,744,002 | 5/1988 | Nakano et al. | 361/335 |
| 4,769,740 | 9/1988 | Wagenbach et al. | 361/333 |
| 4,774,627 | 9/1988 | Wagenbach et al. | 361/333 |

FOREIGN PATENT DOCUMENTS

| | | |
|---|---|---|
| 0093225 | 4/1986 | European Pat. Off. . |
| 2818905 | 10/1979 | Fed. Rep. of Germany . |
| 3121047 | 12/1982 | Fed. Rep. of Germany . |
| 3215236 | 11/1983 | Fed. Rep. of Germany . |
| 3235800 | 4/1984 | Fed. Rep. of Germany . |
| 3248211 | 7/1984 | Fed. Rep. of Germany . |

OTHER PUBLICATIONS

Joachim Gräfling et al., "Mittelspannungs-Leistungs-schalter-Anlage EAK Mit Vakuum-Leistungsschaltern und SF$_6$-Isolation, Brown Boveri Technik", vol. 11, 1986, pp. 629-634.

"Stahlblechgeschottete, SF$_6$-Isolierte Schaltanlagen Typenreihe ZV2", Calor-Emag Elektrizitats-Aktien-gesellschaft, No. 1376/14, pp. 1-15.

Primary Examiner—Gregory D. Thompson
Attorney, Agent, or Firm—Spencer & Frank

[57] ABSTRACT

A metal enclosed multi-phase high voltage switching arrangement filled with compressed gas and provided with an interior protective wall between the bus bar chamber and the switch chamber. The electrical connection between the two chambers is established via gas tight passages or passthroughs arranged diagonally in the protective wall, with the passages being disposed, in one direction, at the spacing between the bus bars and, in the other perpendicular direction, at the spacing of the poles of the high voltage power or load switch in the switch chamber. Straight connections without crossovers are provided in the bus bar chamber between each bus bar and the associated passage via the respective disconnect or three-way position bus bar switch, while the connecting lines in the switch chamber from the passages to the respective poles of the high voltage switch extend in mutually parallel planes, here again without cross-overs.

28 Claims, 13 Drawing Sheets

PRIOR ART  FIG.1A
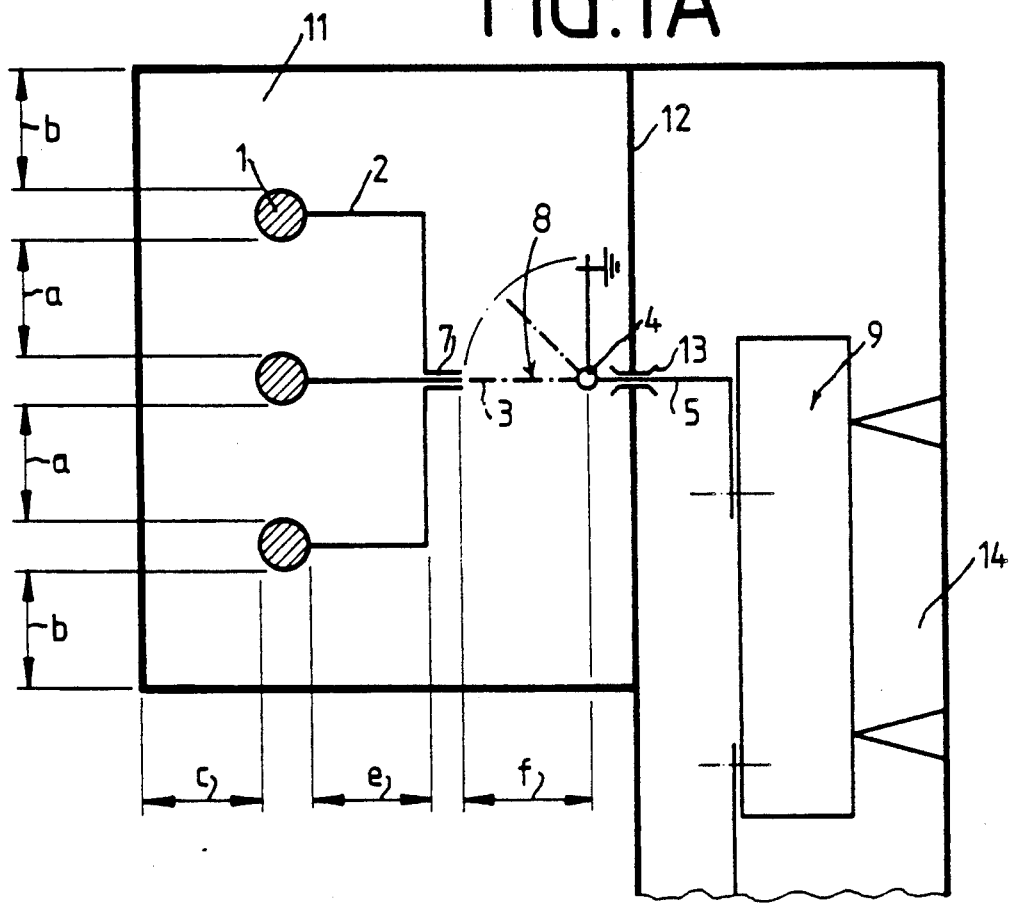
PRIOR ART  FIG.1B
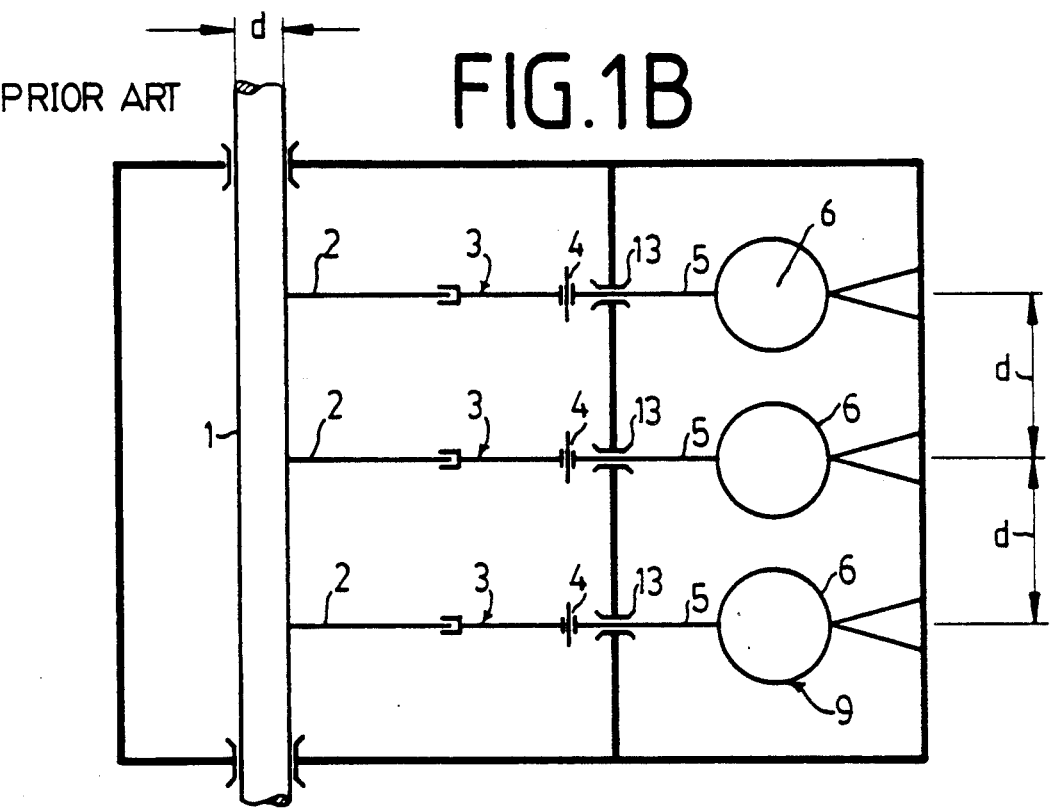

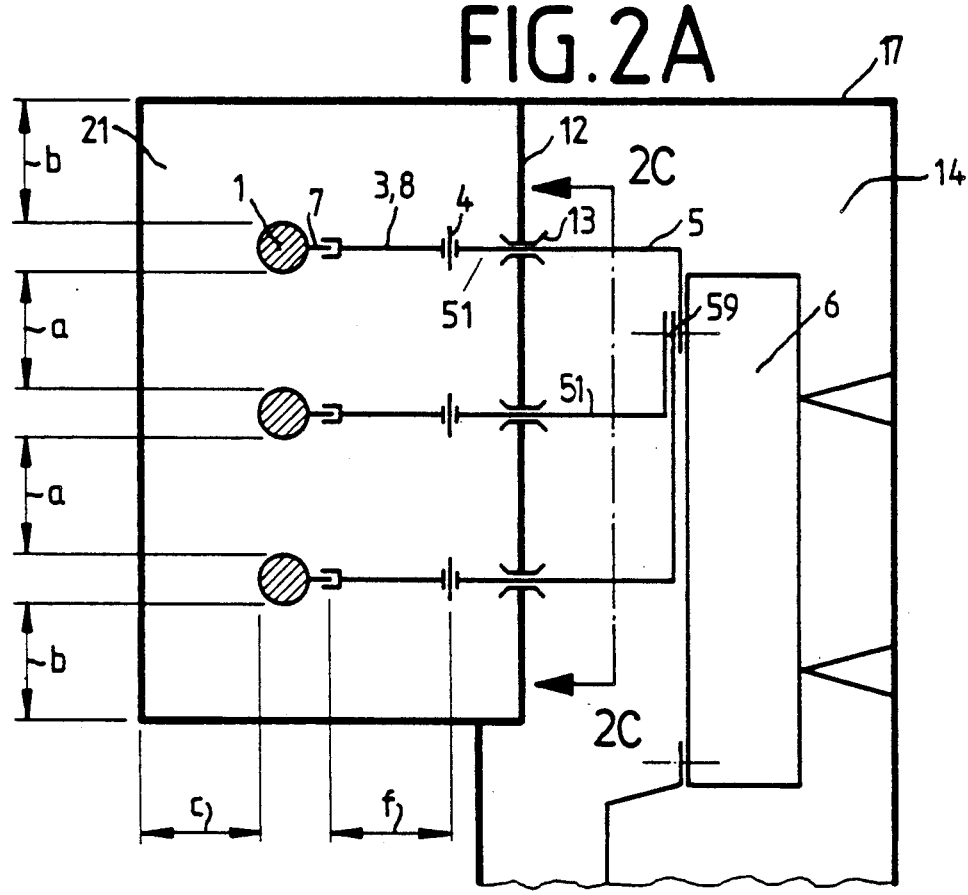
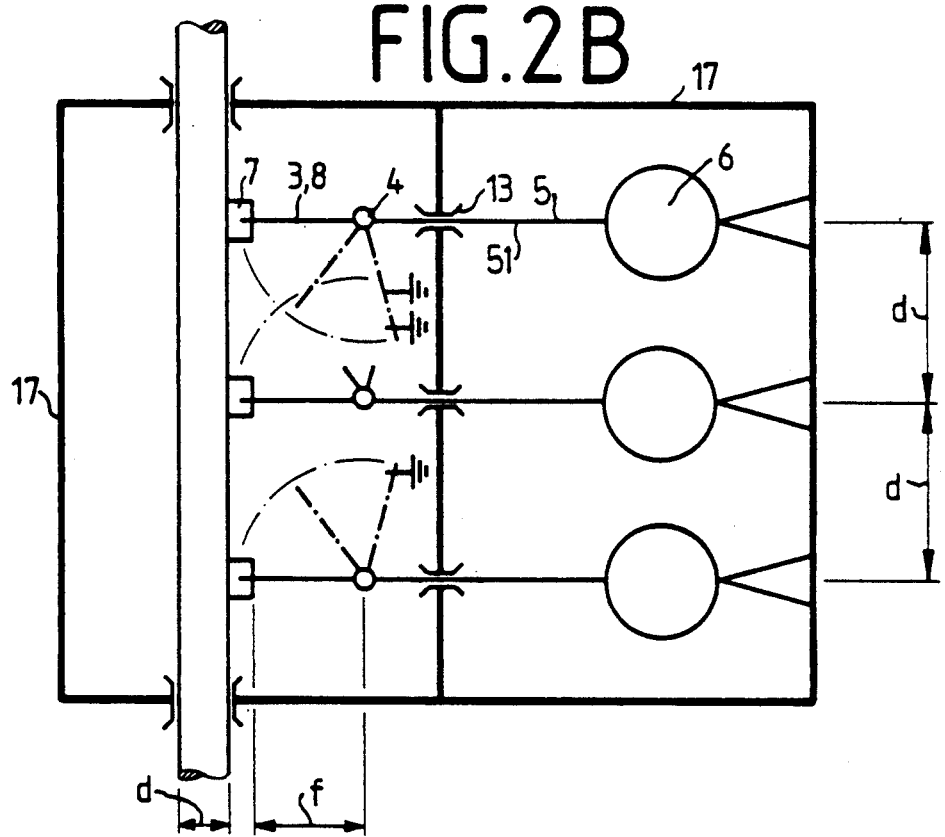

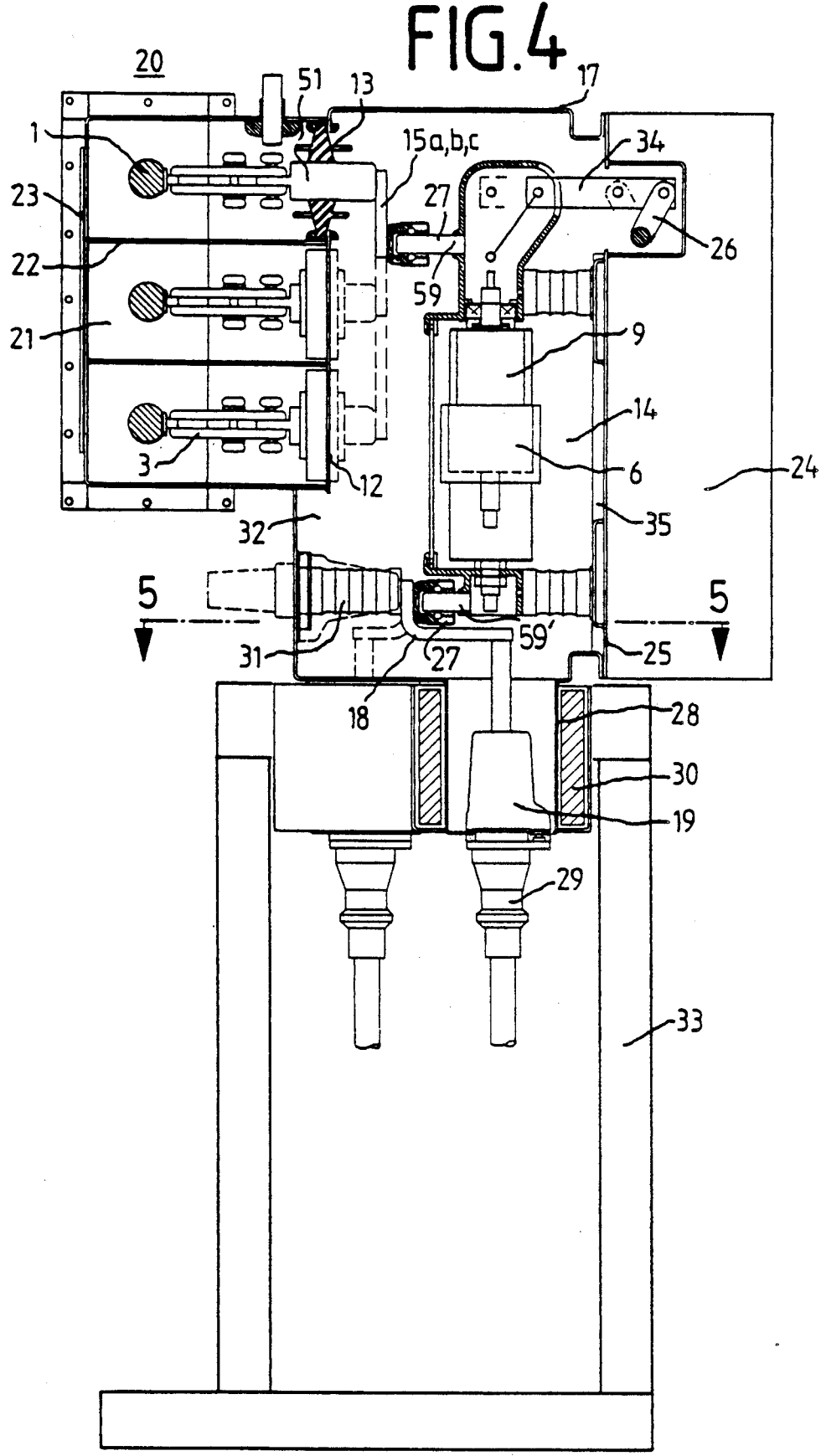

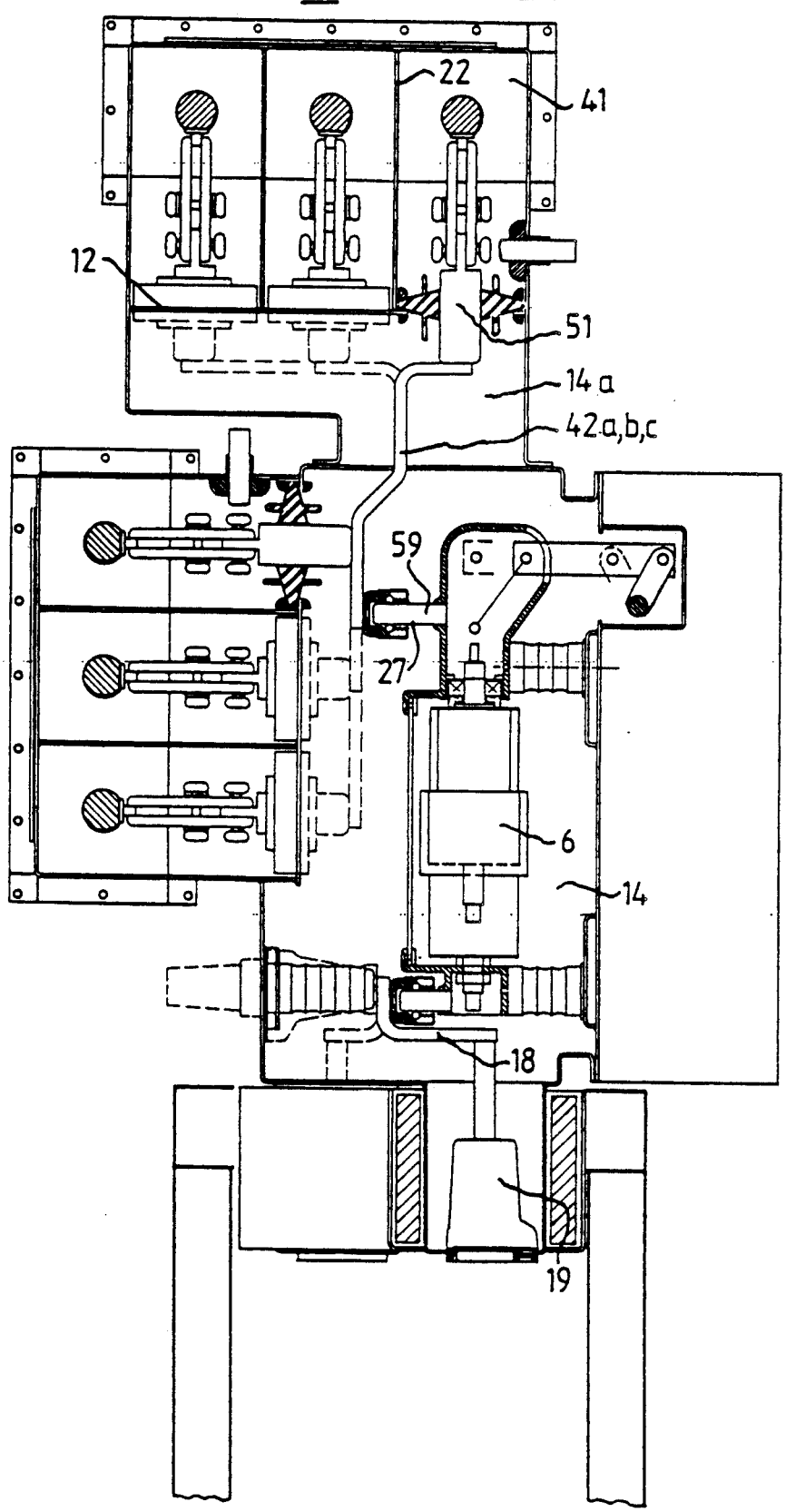

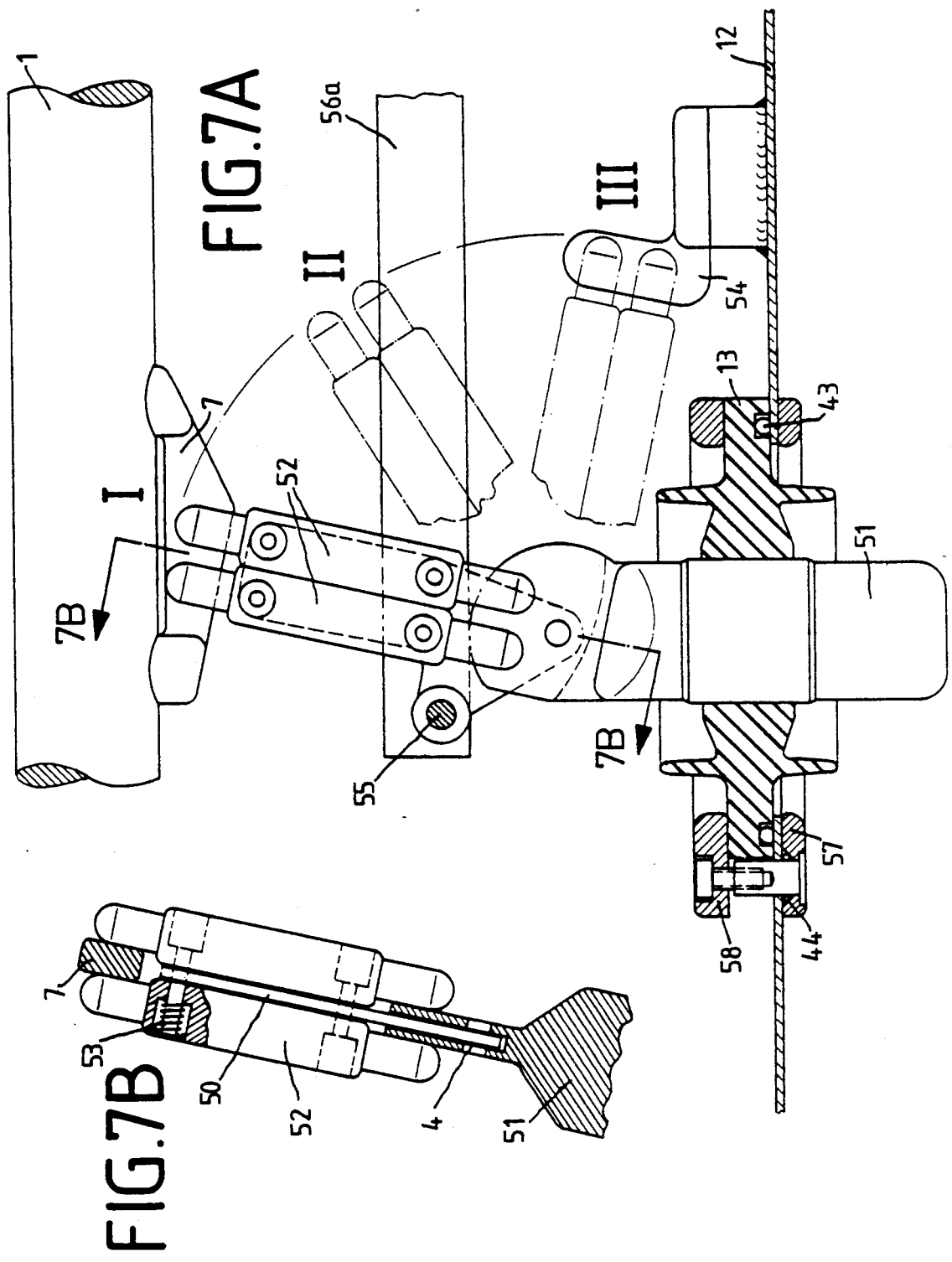

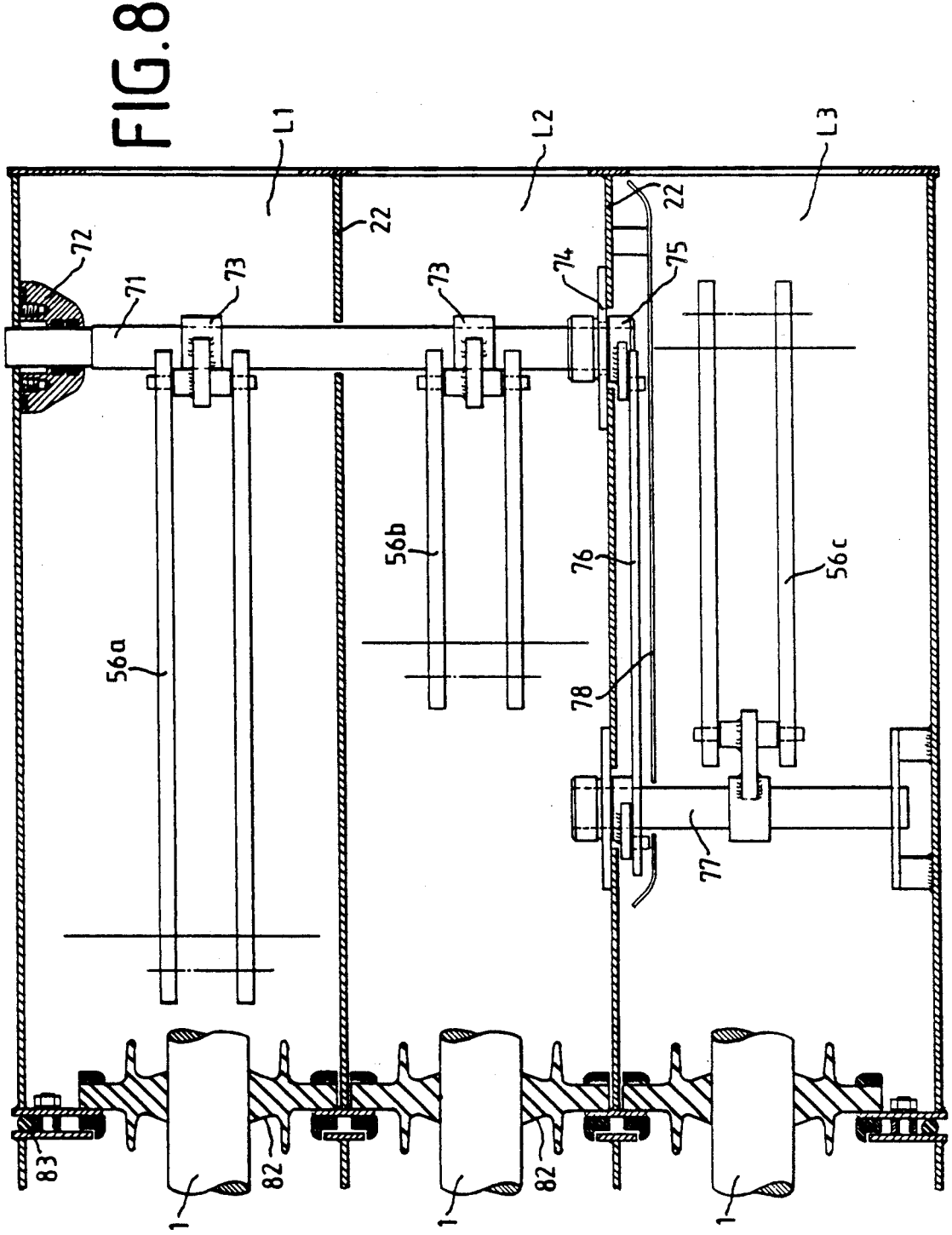

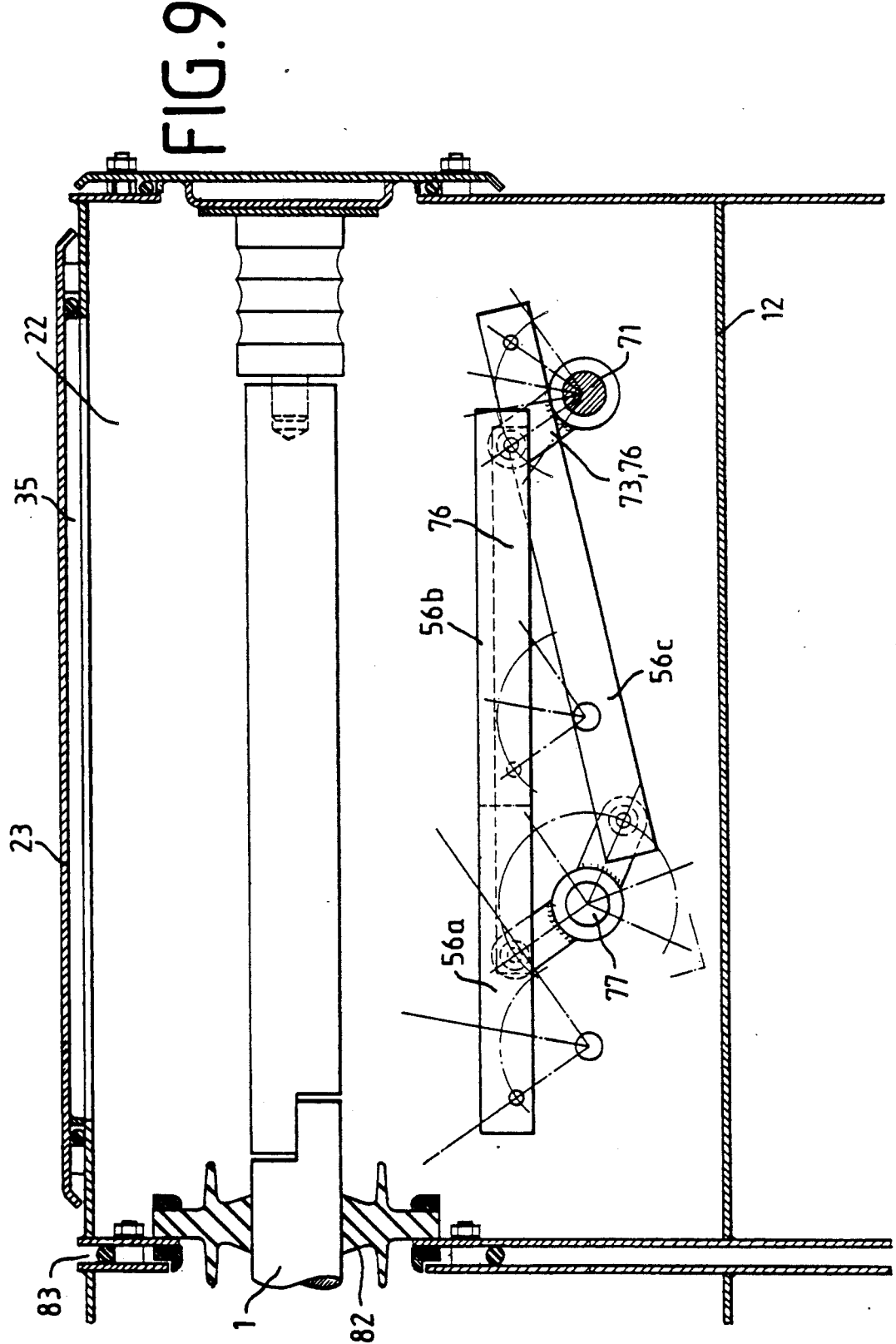

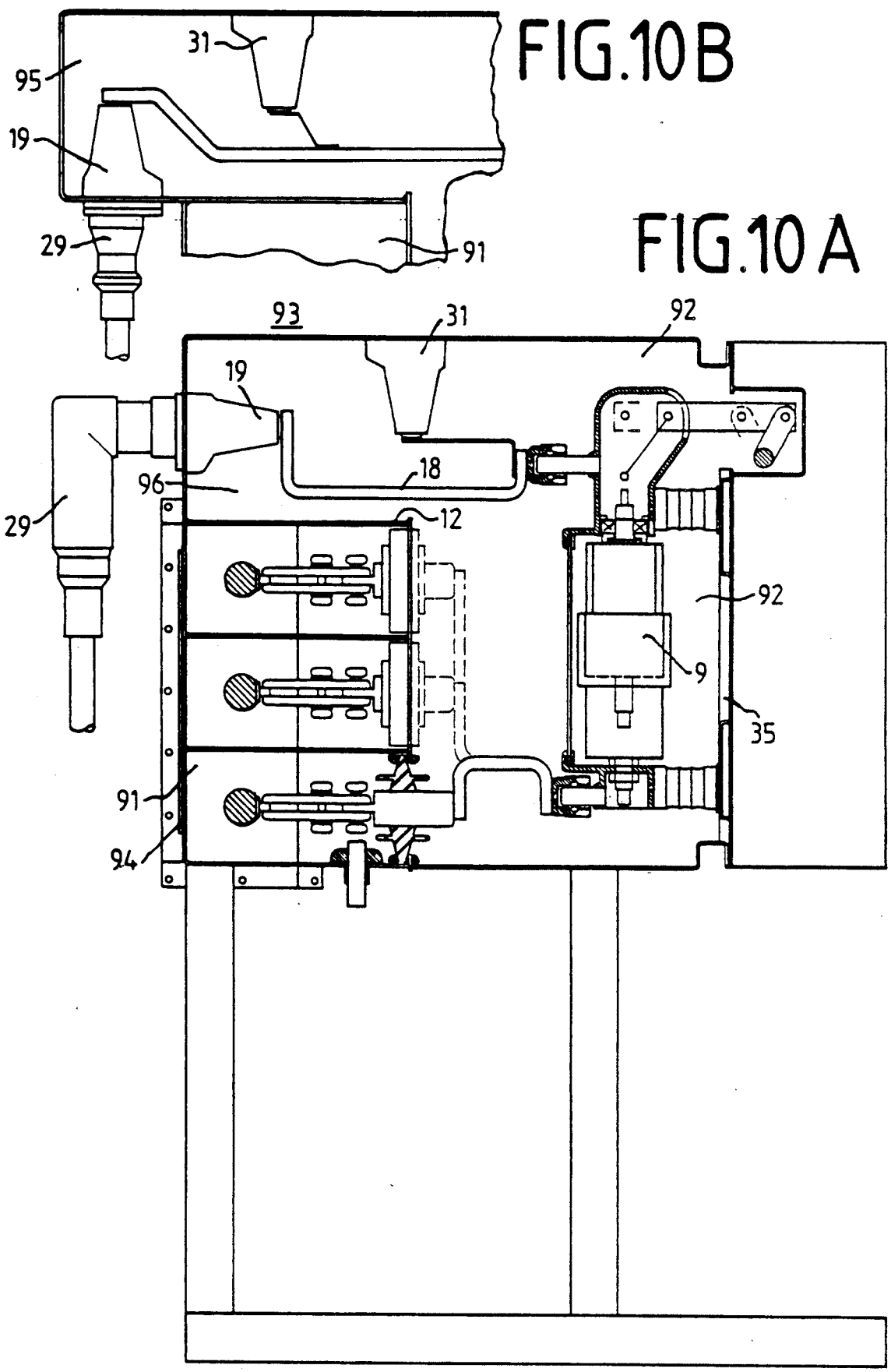

METAL ENCAPSULATED MULTI-PHASE HIGH VOLTAGE SWITCHING SYSTEM FILLED WITH COMPRESSED GAS

BACKGROUND OF THE INVENTION

The present invention relates to a metal encapsulated or enclosed multi-phase high voltage switching system filled with compressed gas for single or multiple double bus-bar systems.

More particularly, the present invention relates to a switching system of the above-type which is provided with protective walls, equipped with passages, for gastightly partitioning the system into the following protected chambers: (1) a switch chamber including a high voltage switch in the form of a power or load break switch, and cable terminals electrically connected with the switch and penetrating the enclosure or encapsulation; and (2) a bus bar chamber for each bus bar system accommodating the respective bus bars and a respective disconnect or three-way switch for each phase connected with the bus bars. Moreover, the protective walls of the switching system are also provided with bushing-type current pins which extend through the passages to electrically connect the two protected chambers, and the poles of the power or load switch are arranged next to one another in a straight line or slightly offset with respect to the front of the switching system.

A system having the above features is known under the name "Steel Sheet Protected, SF6 Insulated Switching System Series ZV2" and is described in Publication No. 1376/14 of Color-Emag ElecktizitAts-Aktiengesellschaft of Ratingen, Federal Republic of Germany, and is composed of a plurality of block-shaped modules which are closed in themselves and are thus separated from one another. The modules each include an operational chamber, e.g. a bus bar chamber. To be able to assemble a complete switching system, the modules of several operational chambers must be combined through the intermediary of gas-tight passages.

In view of the use of block-shaped housings, the known switching system makes it possible to encapsulate or enclose its simple framework in planar sheet metal. To be able to reliably manage the pressures developing during operation or in case of malfunction, without having to make the metal sheets of the encapsulation too thick, these metal sheets are reinforced by additional measures, e.g. ribs welded to their interior or exterior faces.

In the known system, the block-shaped housing modules make it possible to arrange all three bus bars of a system in a plane parallel to the closest covering. Since the bus bar disconnect switches also provided in this module are oriented phase by phase according to the poles of the power switch, the connecting lines between the bus bars and the disconnect switch poles are intertwined and cross over one another. Thus the bus bar chambers have a relatively great depth and, for that reason, they are disposed above or below the switch chamber.

SUMMARY OF THE INVENTION

It is an object of the present invention to provide a high voltage system of this type which has the most compact structure and short, simply configured connecting lines so that the entire system is improved and more economical in configuration and manufacture.

This is accomplished in a system of the type having the features initially described above by providing that:

(1) in each bus bar chamber the electrical connection between the bus bar and the bushing-type current pin in each phase is effected in a straight line and at least approximately at a right angle to the axis of the bus bar, and with the respective straight line electrical connections being in mutually parallel planes;

(2) the passages in the protective wall are staggered diagonally in such a manner that the center lines of their bushing-type current pins in one direction are spaced at a distance equal to the center-to-center spacing of the bus bars and in the other (lateral or perpendicular) direction at a distance equal to the center-to-center spacing of the poles of the power or load switch; and (3) in the switch chamber, the electrical connections between the upper or lower terminals of the power or load switch and the bushing-type current pins is effected in a straight line or at an angle, in mutually parallel planes for the respective phases.

The arrangement of the lines according to the invention results in a number of advantages compared to the prior art switching system and similar products on the market, the most important ones of these advantages being the following.

(a) Due to the straight-line, uncrossed arrangement of the lines, the depth of the bus bar chamber can be minimized.

(b) Due to the diagonal arrangement, the distance between the current paths of the disconnect or three-way switches is clearly greater, with a given bus bar division than in the prior art switching system. This noticeably reduces the danger of electrical sparkover and thus the introduction of a malfunction into the bus bar chamber, even if it is considered that parts of the current paths may have a configuration at individual locations which is unfavorable from a high voltage point of view.

(c) Due to the arrangement of the electrical connections without crossovers within the protected chambers, it is possible to apply grounded partitions to separate the lines by phase. This considerably increases the availability of the switching system since in the case of malfunction no high current phase sparkovers but only earth-fault arcs are able to occur similarly to a single-phase encapsulation. Moreover, the phase partitions according to the invention are connected with the protective wall in an intersecting manner and thus reinforce the protective wall to a special degree. Thus no deformations and thus no untightness will occur in the case of malfunction at the locations where the insulated passages are screwed in.

(d) The idea of the invention can also be utilized if the prior art block or cube-shaped protected chambers of the basic switching system are combined into a one-piece housing, in which case "nesting" of the protected chambers and thus further reduction of the enclosed volume of the switching system can be realized effortlessly. Moreover, there will then be only a few locations that have to be sealed and thus the leakage rate will be lower.

(e) Another advantageous feature of the invention is the use of separate housings for the bus bar chamber and the switch chamber so that, in the case of a malfunction in the switch chamber, the latter can be removed as a whole without it being necessary to interrupt operation in one of the bus bar systems.

BRIEF DESCRIPTION OF THE DRAWINGS

These and other aspects of the invention will be better understood from the following description of the preferred embodiments with reference to the accompanying drawings in which:

FIGS. 1A and 1B are schematic representations, in a side and top view, respectively, of the arrangement of the conductors in the bus bar chamber and in the switch chamber of a prior art switching system;

FIGS. 2A, is a schematic representation in a side view, FIG. 2B is a schematic representation and FIG. 2C is a schematic representation in a sectional view along line 2C—2C of FIG. 2A, respectively, of the arrangement of the of the conductors in the basic embodiment of the switching system according to the invention;

FIG. 4 is a sectional view of an arrangement according to the invention for a single bus bar system;

FIG. 6 is a sectional view of an arrangement according to the invention with a double bus bar system;

FIG. 7A is a sectional view, seen from the top, of a bus bar chamber including a three-way switch;

FIG. 7B is a sectional view along line 7B—7B FIG. 7A;

FIG. 8 is a sectional view of a bus bar chamber including the drive arrangement for the three-way switches, seen from the partition;

FIG. 9 is a sectional view of a bus bar chamber including the drive arrangement for the three-way switches seen from the top;

FIGS. 10A and 10B are sectional views of two different embodiments of an arrangement according to the invention for a single bus bar system with the cable terminal disposed at the top;

DESCRIPTION OF THE PREFERRED EMBODIMENTS

Figure 2C:
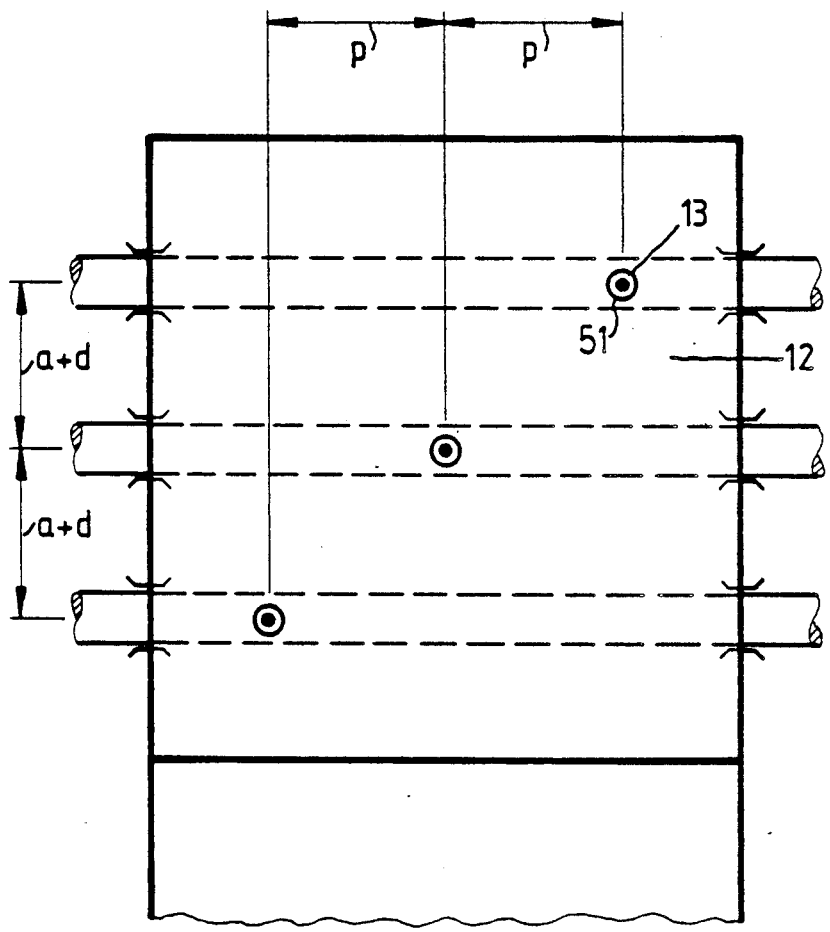

In FIGS. 1A and 1B, bus bar chamber 11 of the prior art switching system has a block shape and contains superposed bus bars 1, and respective leads 2 connecting the respective bus bars to the counter contacts of respective bus bar switches in the form of three-way switches 3 whose axes of rotation 4 are attached phase by phase to passages or pass-throughs 13 installed in a gas-tight manner in a protective wall 12. Respective connecting lines 5 connect each one of passages 13 with a respective pole 6 of the power switch 9 disposed in switch chamber 14. The height of bus bar chamber 11 is determined by the diameter d of the bus bars 1, the distances a between adjacent bus bars 1 and the distances b between the upper and lower walls of the chamber 1 and the upper and lower bus bars 1, respectively, while the depth of chamber 11 is determined by distance c from the bus bars 1 to the side wall, the diameter d of the bus bar, the depth e of the bent lead 2 which intersects the middle bus bar and the length f of the moveable switching member 8 of three-way switch 3. The phases of the three-way switch have axes of rotation 4 which are aligned with one another, and their pivot planes, which are parallel to one another, are spaced from one another at the same distance p as the separation of the centers of the poles 6 of the high voltage switch in the form of power switch 9. Due to the length and configuration of leads 2, the countercontacts (fixed contacts) 7 must be fastened to isolators (not shown).

FIGS. 2A and 2B show, for the switching system according to the invention, that the height of bus bar chamber 21 is determined by the same parameters as in the prior art switching system according to FIGS. 1a and 1b. However, the lines extend in straight lines in the individual phases, from bus bars 1 to passages 13 by way of the three-way switches 3, in mutually parallel planes, so that only the dimensions c, d and f are determinative for the depth. It can also be seen in FIG. 2B that passages 13 are aligned phase by phase with poles 6 of the power switch and thus are in a diagonal line along protective wall 12 in a staggered manner (FIG. 2C). In this way, it is possible to realize the shortest possible lines in each phase between bus bar 1 and power switch pole 6 by way of a three-way switch 3, a bushing-type current pin 51 disposed in passage 13 and a connecting line 5, with countercontact (fixed contact) 7 for the movable switching element 8 of three-way switch 3 being attached directly at bus bar 1 without any additional support from an isolator. The straight line arrangement of the conductors as proposed by the present invention also substantially avoids, in the case of a short circuit, the generation of electrodynamic forces which could act on the line sections. In each phase, the axis of rotation 4 intersects, at a right angle, the plane defined by bus bar 1 and three-way switch 3 in which thus also takes place the pivoting movement of the switching member 8 of three-way switch 3 during switch-off and grounding. The width of bus bar chamber 21 can be minimized in that, according to FIG. 2B, the three-way switches 3 for the two outer phases are pivoted in opposite directions toward the interior of the switching system, with the pivoting direction of the center phase being selectable as desired. As is clear from FIGs. 2A-4 the housing (enclosure) 20 has chambers 14 and 21 which are cube or block shaped and planar covers 17, the chambers being separated by protective walls 12.

Figure 3B:
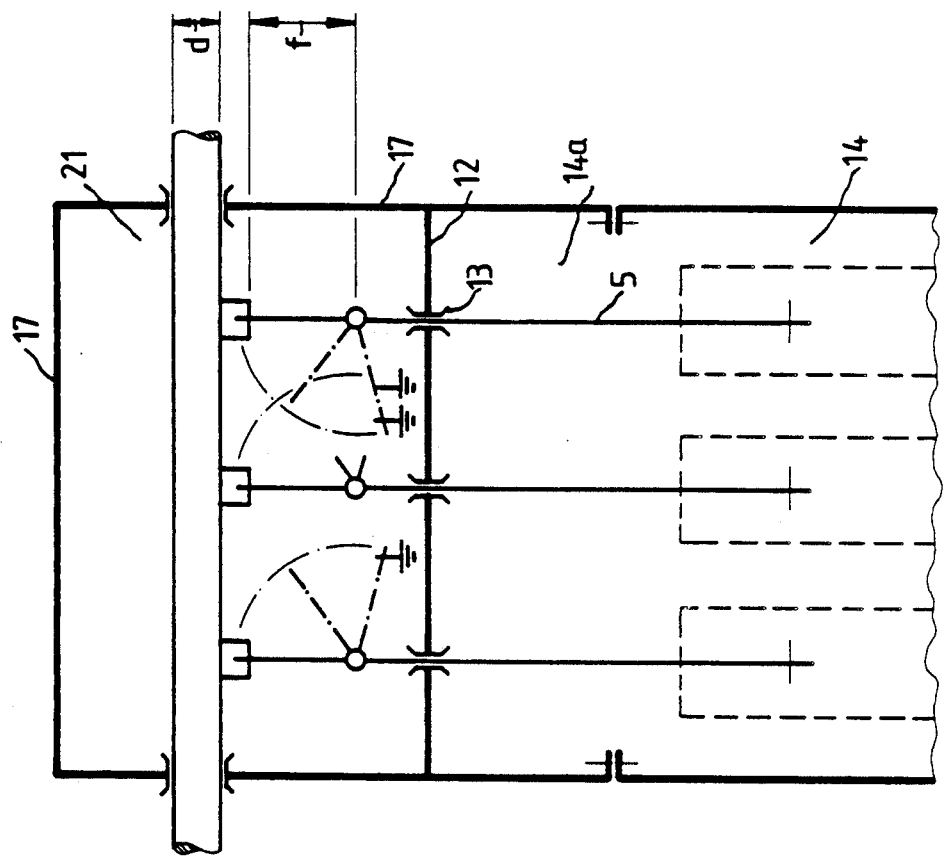
FIGS. 3A and 3B are schematic representations, in a side view and a front view, respectively, of the arrangement of the conductors in the switch chamber and in the bus bar chamber arranged thereabove in a separate housing in the switching system according to the invention.
Figure 3A:
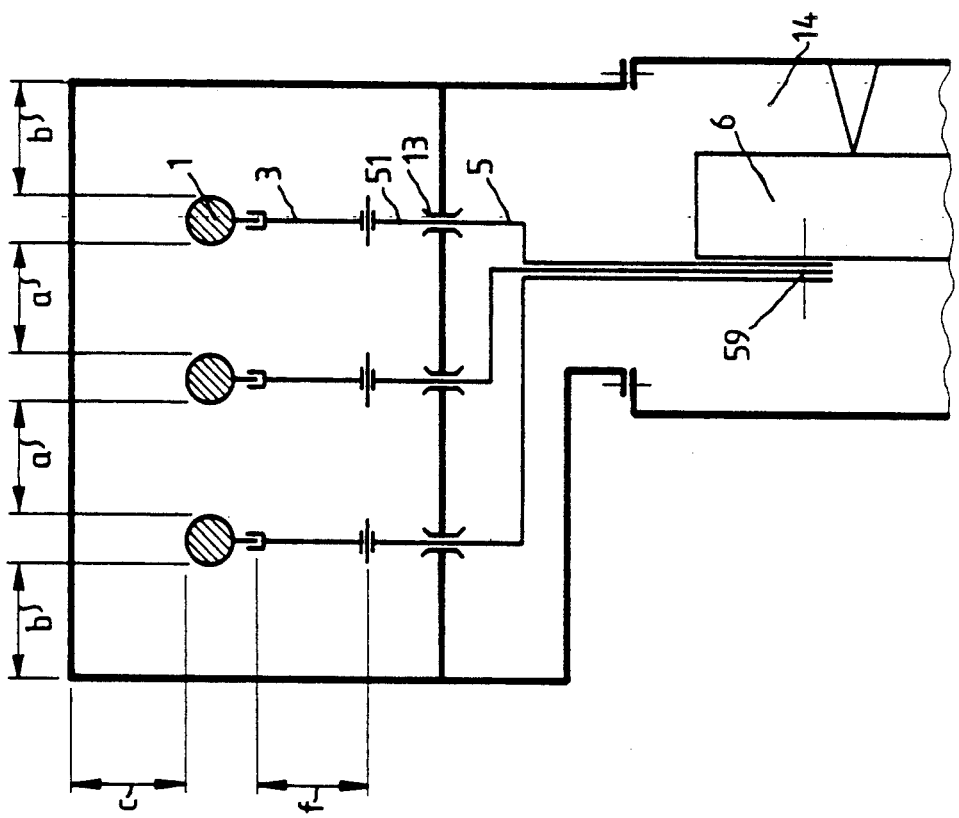

Referring to FIG. 3A and 3B, the proposed arrangement of the conductors in bus bar chamber 21 can also be employed in a switching system in which this chamber lies above switch chamber 14 and is rotated by 90. with respect to the switch chamber. The connecting lines 5 between bushing-type current pins 51 and switch poles 6 in switch chamber 14 and the associated partial volume 14a extend with different bends (FIG. 3A) but in mutually parallel planes (FIG. 3B). Thus, the diagonal arrangement of the three passages 13 in protective wall 12 remains in effect, as in FIG. 2C.

In the description above, disconnect switches and separate devices can also be employed instead of the three-way switches to operationally ground the branches.

The structural configuration of a single bus bar system according to the line scheme of FIGS. 2A, 2B and 2C can be seen in FIG. 4. A housing 20 includes a block-shaped bus bar chamber 21 and a switch chamber 14 and has a one piece construction. Protective wall 12 is provided with passages 13 in a diagonally offset manner, with the three-way switches 3 being mounted in a rotatable manner on the pins 51 at these passages 13. Bus bars 1 are arranged in straight lines above one another and are mounted in passages (not shown). A gas-tightly attached cover 23 seals the installation opening of bus bar chamber 21.

The power switch 9 is composed of three poles 6 (only one of which is seen in the figure) and a drive 24 whose basic frame 25 seals the installation opening of switch chamber 14 in a gas-tight manner with sealing strips. Drive 24 also includes, outside of the gas filled chamber, an energy store for switch-on and switch-off and the usual control and signalling members. The driving movement is transferred by way of gas-tightly mounted cranks 26 and an insulated switching rod 34 to the movable switch contacts of poles 6. In order to facilitate maintenance of power or load switch 9 and its movable parts, without requiring larger installation openings at housing 20, the electrical connections to the upper (bar or bus connection) and lower (power) terminals 59 and 59' of the power switch 9 are effected by way of simple plug-in contacts 27.

Plug-in the respective plug-in contacts 27 disposed at the two (upper and lower) regions of the terminals 59 are preferably at the same heights for all three poles 6. Connecting lines 15a, 15b, 15c to bushing-type current pins 51 thus have different lengths and are arranged phase by phase in the same planes as the respective poles 6 of the power switch. The distance between the voltage carrying phases is nowhere reduced by bends or intersecting conductors. Since the bushing-type current pins 51 and poles 6 of power switch 9 are very stable supports, additional supports for the connecting lines, particularly by means of isolators and the like, can be substantially avoided.

Housing 20 changes in its lower connection region to single-phase encapsulated cylindrical connecting chambers 28 (see FIG. 5), with one cable being connectable in each by way of a high voltage plug 29 and a cable terminal or socket 19. Connecting chambers 28 are arranged in the form of a triangle and may be equipped, on their exteriors, with the secondary windings of transformers 30 as known from prior art structures. Moreover, further cable terminals or plug-in sockets 31 for the connection of voltage transformers or for the application of normally grounded connections or the like, may be provided for each phase in the lower region of housing 20. As shown the sockets 31 extend preferably in a horizontal (rear to front) direction and are connected to respective short lines 18 adjacent the respective lower connection terminals 59 of the switch 9. The cable terminals or sockets 19 are connected phase by phase with the lower plug-in contacts 27 by means of the short lines 18. Instead of the triangular arrangement of FIG. 5, the power cable terminals 19 may also be arranged by phase in a diagonally staggered arrangement with respect to the front of the system.

Figure 5:
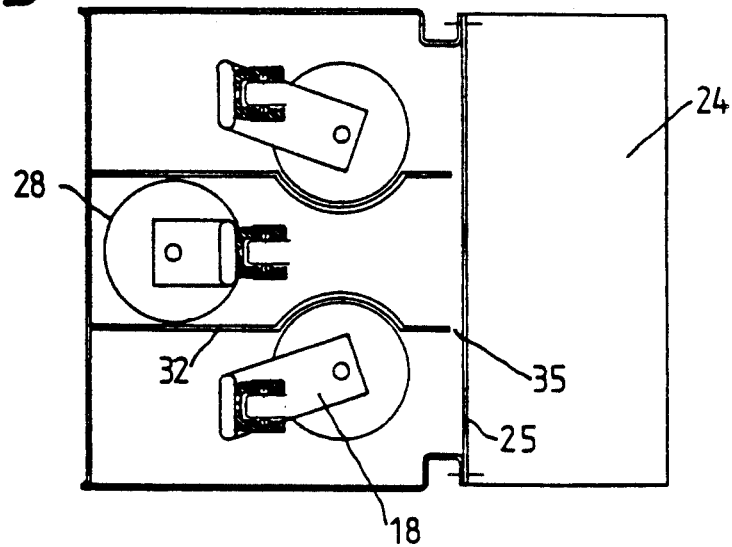
FIG. 5 is a sectional view of the lower connection region of FIG. 4 along line 5—5.

According to a further feature of the invention as shown in FIGS. 4 and 5, grounded partitions 22 and 32, respectively, separate bus bar chamber 21 as well as switch chamber 14 over their entire height and depth into three single-phase, mutually not gas-tight chambers. These chambers are not sealed with respect to each other. Partitions 22 and 32 form a right angle with one another and abut on both sides of protective wall 12, being firmly connected therewith, for example by welding. Protective wall 12 is thus optimally reinforced which has an advantageous effect, primarily in the case of arc interference in one of chambers 21 and 14, since passages 13 which are inserted in a sealed manner cannot become untight due to dents in protective wall 12. In this way, the unaffected protected chamber, e.g. bus bar chamber 21, remains operational without limitations.

According to a further feature of the invention, primarily slit-shaped connecting openings 35 are provided, for example, in partitions 22 and 32, respectively, opposite cover 23, and basic frame 25 for drive 24, where during operation of the system there are relatively low electric field intensities. These openings provide gaseous communication between the subdivisions and therefore in the case of pressure development due to an internal arc, these openings enable a pressure equalization to take place within protected chambers 14 or 21 and thus partial overloading of one partial chamber is prevented. Additionally, partitions 22 and 32 are connected with adjacent covers 17 which are firmly attached and thus reinforce them as well.

A switching system according to FIG. 4 rests on a base 33 whose height is dependent upon the accessibility of the high voltage plugs 29 during installation.

FIG. 6 shows a double bus bar system based on a single bus bar system as shown in FIG. 4. The second bus bar chamber 41 here has its conductors or liner arranged as shown in FIG. 3 and is accommodated in a housing 40 in which part 14a of an enlarged switch chamber is also disposed and includes connecting lines 42a, 42b, 42c from bushing-type current pins 51 to plug-in contacts 27 at the upper side of the poles 6 of power switch 9.

As shown in FIGS. 4 and 6, the internal configurations of the two bus bar chambers 21 and 41 are completely identical. This also applies for the configuration and drive of the three-way switches which will be described below.

For each phase, the three-way switch 3 is pivotable either in the respective phase plane defined by the axis of the corresponding bus bar 1, the corresponding bushing-type current pin 51 and the current path through the switch 3 in its closed position or in a plane parallel to and separated by a small distance from, the respective phase plane. According to FIGS. 7A and 7B, a three-way switch 3 is composed of a support 50 made of sheet metal whose axis of rotation 4 is mounted in a fork of bushing-type current pin 51. Symmetrical current carrying contact bridges 52, in the present case two on each side, are attached to support 50 by way of contact springs 53 in such a manner that, in the switched-on state, they connect pin 51 with countercontact 7 fastened to bus bar 1. Support 50 is provided with an eye 55 at which engages a drive rod 56 for each switch. Eye 55 is arranged in such a manner that the switch, for example, of the outer phase on the left, as shown in FIG. 8, can be moved by means of drive rod 56 from the operating position I shown in FIG. 7A to the disconnect position II and the grounded position III.

In the grounded position III, contact bridges 52 contact ground contact 54 which is in conductive communication with the grounded protective wall 12, for example by way of a weld.

FIG. 7A also shows the gas-tight installation of passage 13 in protective wall 12. Consequently, passage 13 is inserted together with the already attached three-way switch through the installation opening of bus bar chamber 21 or 41 (FIG. 4 or FIG. 6) and is tightened against protective wall 12 by means of clamping rings 57 and 58 and screws. The seal is here provided by gaskets 43 and 44.

In the selected embodiment shown in FIG. 8, the three-way switches for phases L1 and L2 open clockwise and the switch for phase L3 opens counterclockwise (see FIGS. 2b and 3b). Moreover, for kinematic reasons, the direction of the switch-on contact bridges 52 slightly deviates from the elongate, straight path, as mentioned in the present specification in connection with FIGS. 2a and 2b, which, however, does not narrow the advantages of the inventive idea.

FIGS. 8 and 9 show the drive for the three-way switches of a bus bar chamber 21 or 41. As already indicated in connection with FIG. 4, a drive shaft 71, coming from a drive outside the switching system encapsulation, enters into bus bar chamber 21 or 41 through a bearing location 72 provided with sealing means and penetrates partitions 22 between bus bars 1 for phases $L_1$ and $L_2$ and for phases $L_2$ and $L_3$, leaving a narrow gap. The position of these phases is also shown in FIG. 4, for example. In order to transfer the switching movement to phases $L_1$ and $L_2$, a respective crank 73 is provided on drive shaft 71 for each of these phases, with drive rods 56a and 56b establishing a connection with the respective three-way switches (not shown in FIGS. 8 and 9; see FIGS. 7A-7B). In the partition 22 between phases L2 and L3, drive shaft 71 is guided in a bearing 74 and transfers its motion into rotation of a second rotatably mounted shaft 77 in an opposite direction through a four-bar mechanism installed on that partition 22.

In particular, the shaft 71 is terminated by a crank 75 which, by way of rods 76, moves a second shaft 77, and from there by way of a crosswise arranged drive rod 56c, crank 75 moves the three-way switch belonging to phase $L_3$ which is switched in the opposite sense of rotation. The rods 76 are covered against the voltage carrying components by a shield 78 mounted on the partition 22.

FIG. 9 also shows the installation opening 35 for bus bar chamber 21 and its cover 23 as well as the connecting opening 35 between the partial chambers defined by partitions 22. Additionally, FIG. 9 shows the protective wall 12, bus bars 1 and their passages 82 as well as the gas-tight screw connection 83 between two adjacent switching systems. This figure also shows how the problem of fastening the bus bars is solved for an end field. However, these details are not of significance for the present invention and will therefore not be discussed further.

FIG. 10A shows the switching system according to the invention with a connecting region disposed above the bus bar chamber, as used in stations not employing cable channels. Bus bar chamber 91 and switch chamber 92 here have the same significant features as shown in FIG. 4. Switch chamber 92 is partitioned in such a manner that cable terminal 19 and at least one high voltage plug 29 per phase are provided behind power switch 9 and above bus bar chamber 91. Housing 93 may here have a flush rear wall 94, as shown in FIG. 10A with the terminals or sockets 19 for the plugs 29 inserted horizontally in a rear to front direction connect, or, as shown in FIG. 10B, a part 95 which projects beyond bus bar chamber 91 and into which the terminals 19 for the plugs 29 are inserted vertically (in the direction of alignment of the bus bars 1) from the bottom. In the upper part of switch chamber 92, vertically extending plug-in sockets 31 are provided for the connection of voltage transformers and the like. In this embodiment, partitions 96 in switch chamber 92 pass around protective wall 12 on two sides.

Figure 11:
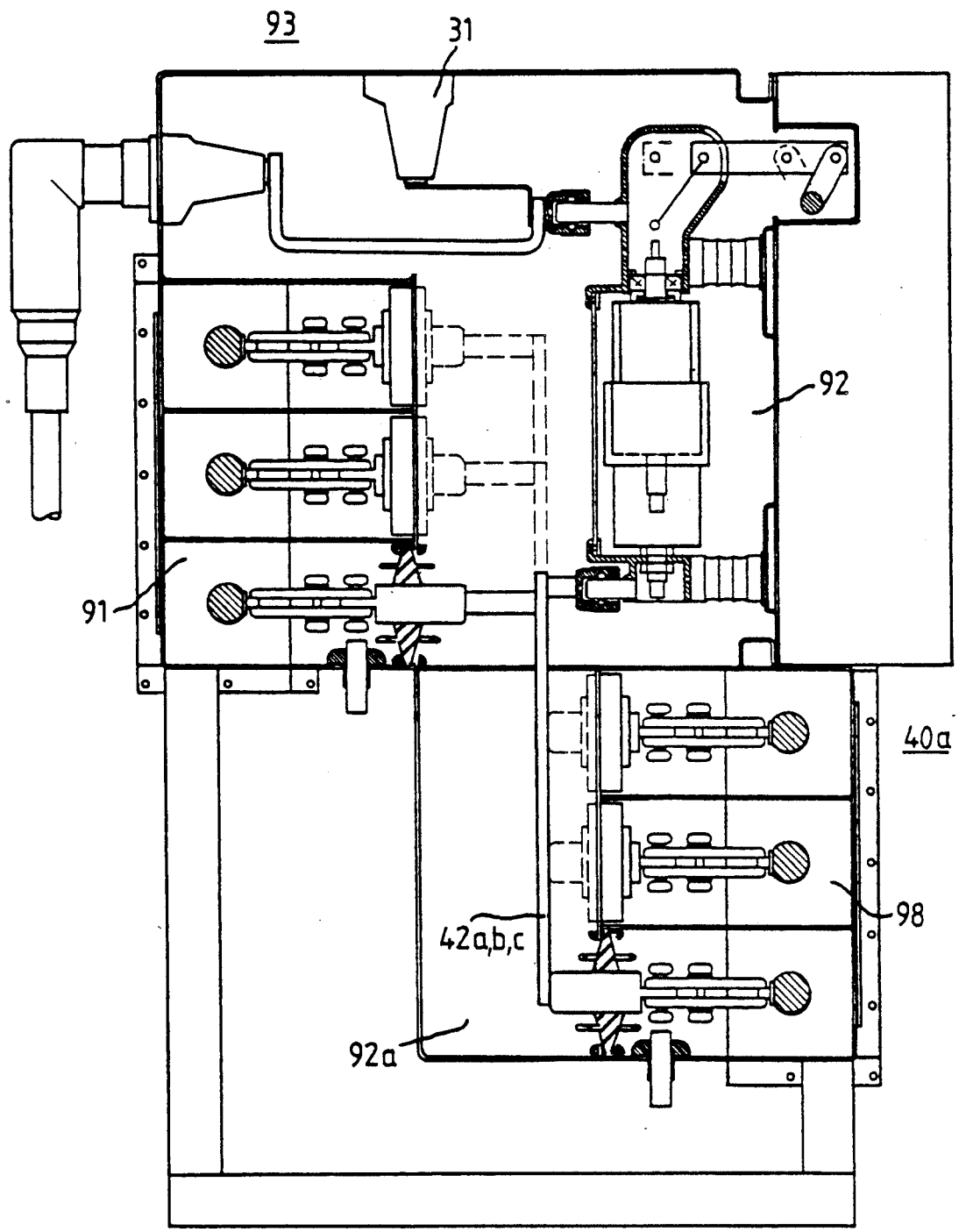
FIG. 11 is a sectional view of an arrangement according to the invention for a double bus bar system with the cable terminal disposed at the top.

Switching systems having the cable terminals at the top can also be modified in an advantageous manner to serve as double bus bar systems. The arrangement of FIG. 11 in housing 403 here represents a possible embodiment in which the essential features of the invention are employed in switch chamber 92 as well as in the two bus bar chambers 91 and 98, the partial volume 92a containing the connecting line conductors 42a, 42b, and 42c. The same reference numerals apply as used in FIG. 10A.

Figure 12:
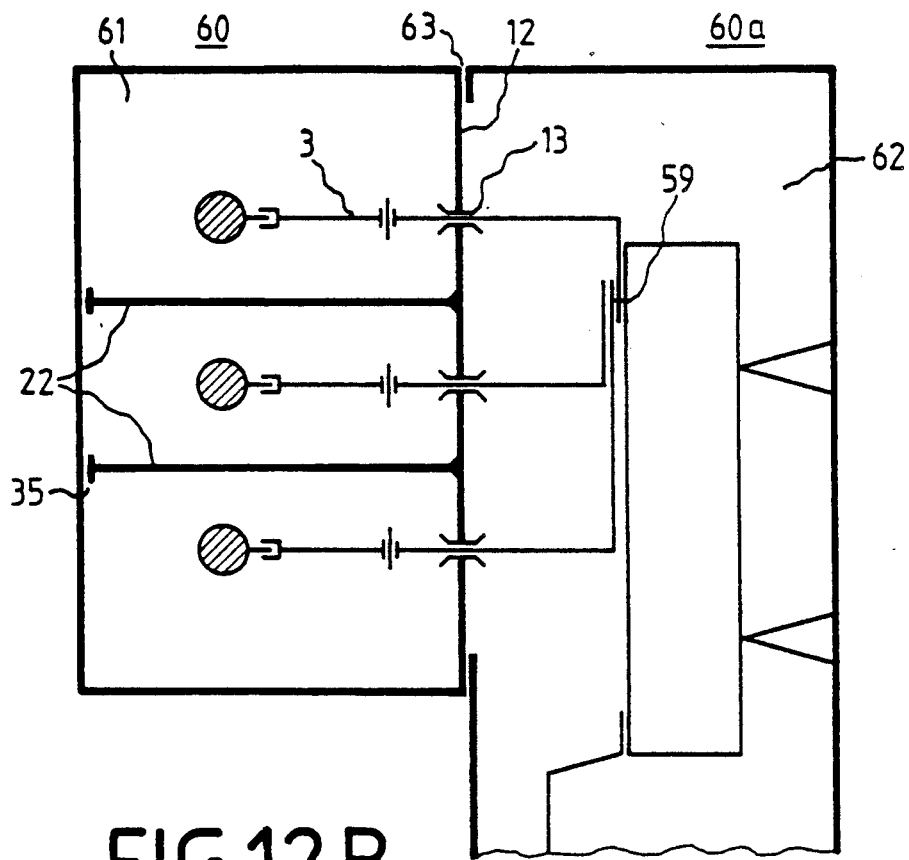
FIGS. 12A and 12B are schematic representations of the basic configuration of the system according to the invention when there are separate housings for the protected chambers.
Figure 12:
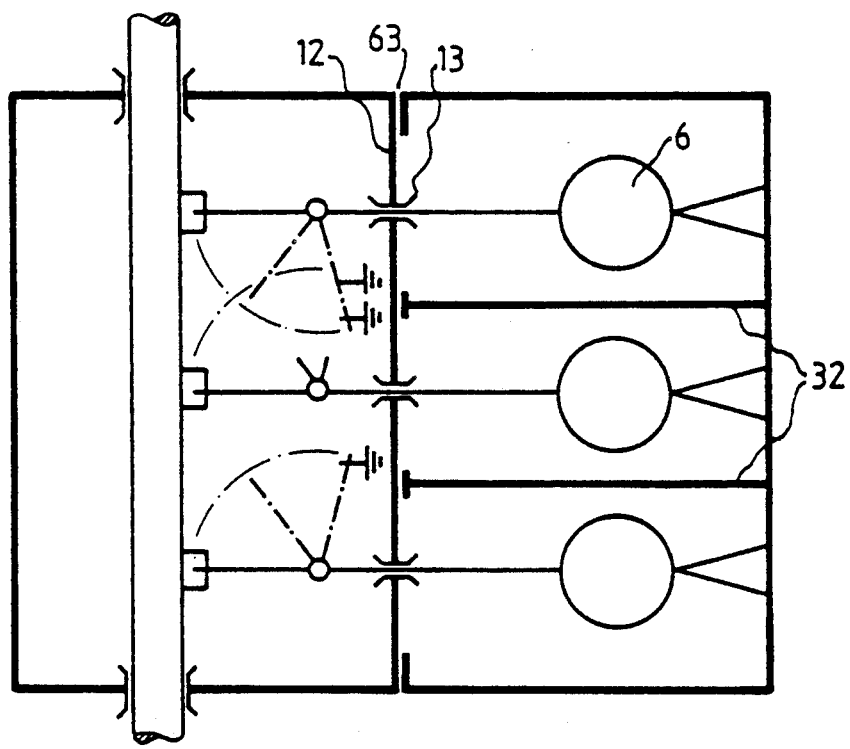

The basic configuration of the switching system according to the invention can also be configured, as shown in FIGS. 12A and 12B, to have a two-part housing 60 and 60a. Housing part 60 here accommodates bus bar chamber 61. This chamber is defined by protective wall 12 and its passages 13. Switch chamber 62 is provided in housing part 60a which is open with respect to protective wall 12. The two housing parts 60 and 60a are connected together, by way of a fastening device 63 (not shown in detail) in a gas-tight but releasable manner. This embodiment has the advantage that, if there is a malfunction in any part of switch chamber 62, the latter can be disassembled completely, once the insulating gas has been discharged, and can be exchanged for a new one. The supply of energy to the remainder of the switching systems need then not be interrupted since bus bar chamber 61, with three-way switches 3 grounded, remains ready for operation.

FIGS. 12A and 12B, respectively, also show partitions 22 and 32 schematically. According to the concept of this embodiment of the system, the two partitions 22 are firmly connected with the protective wall 12, e.g. welded to it, while partitions 32 lie against the protective wall, releasable at any time.

Figure 13:
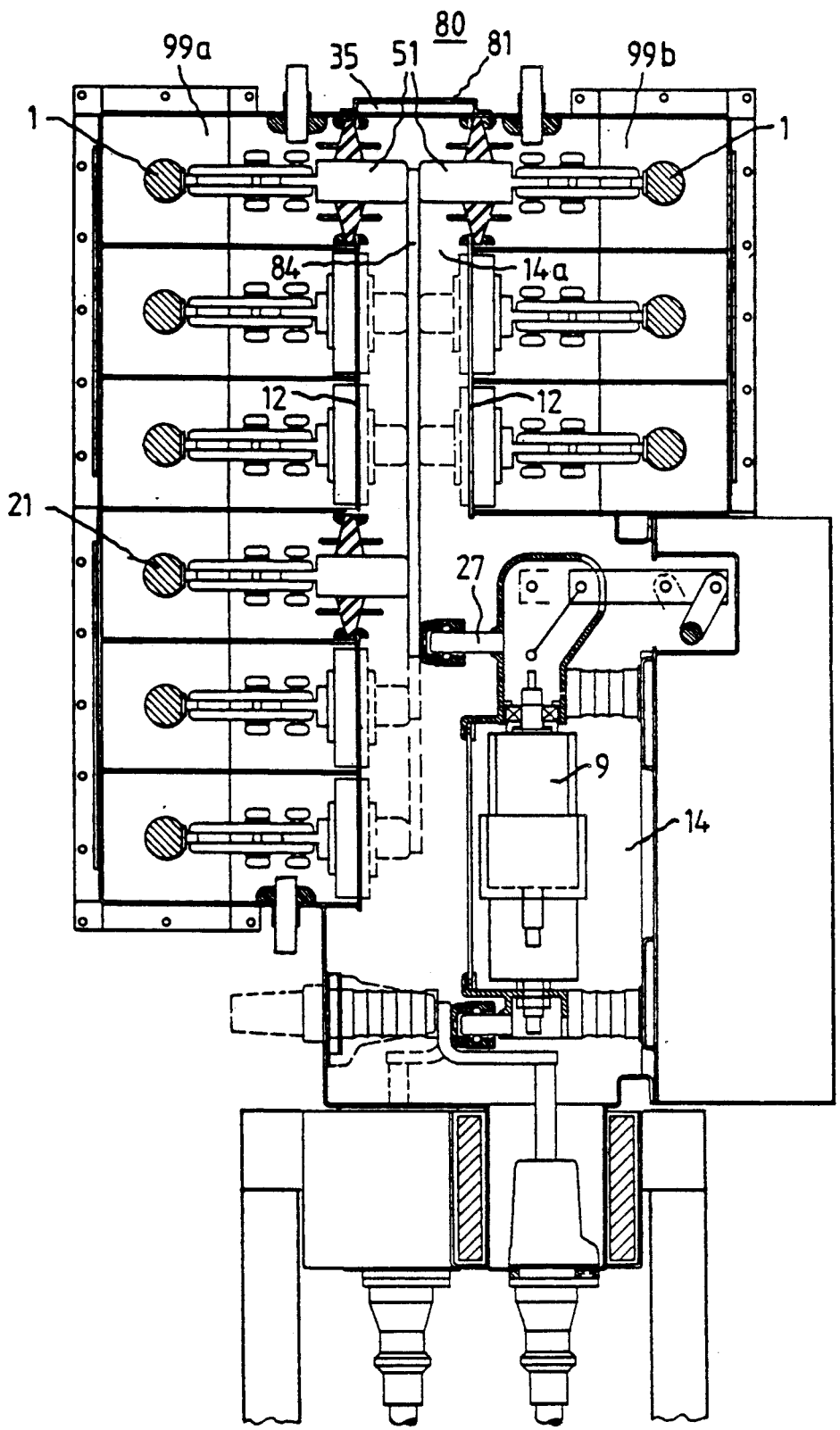
FIG. 13 is a sectional view of the switching system according to the invention including a triple bus bar system.

FIG. 13 shows a triple bus bar system. Based on the configuration according to FIG. 4 or FIGS. 12A, 12B, two symmetrically arranged bus bar chambers 99a and 99b are accommodated in a housing 80. Each one of the bus bar chambers corresponds in all details to bus bar chamber 21 in FIG. 4 and to bus bar chamber 41 in FIG. 6, respectively. The center part of housing 80 accommodates a partial volume 14a of switch chamber 14 including connecting lines 84 which establish a connection between bushing-type current pins 51 and plug-in contacts 27 of power or load switch 9. In operation, a cover 81 closes the installation opening of the center part in a gas-tight manner. Housing 80 is connected with housing 20 or with the two-part housing 60/60a of the basic embodiment likewise in a gas-tight manner.

The power or load switches 9 may be vacuum switches. It is also conceivable in each embodiment to use the insulating gas, such as SF6, provided in the switch chamber (14, 62 or 92) as the quenching agent for the power and load switches 9.

The present disclosure relates to the subject matter disclosed in Federal Republic of Germany Patent Application No. P 37 15 053.7, filed May 6, 1987, the entire specification of which is incorporated herein by reference.

It will be understood that the above description of the present invention is susceptible to various modifications, changes and adaptations, and the same are intended to be comprehended within the meaning and range of equivalents of the appended claims.

We claim:

1. In a metal enclosed multi-phase high voltage switching arrangement filled with compressed gas, comprising:
    a first bus bar system;
    a metal enclosure filled with compressed gas and provided with interior protective walls which partition the interior of the enclosure into a plurality of gas-tight protected chambers including a single switch chamber and a first bus bar chamber for accommodating said first bus bar system with said first bus bar chamber having in common with said switch chamber a first protective wall portion which is a first portion of said interior protective walls;
    a plurality of gas-tight passages, one for each phase, formed in said first protective wall portion, and a respective bushing-type current pin gas tightly extending through each of said passages to provide respective electrical connections between said first bus bar chamber and said switching chamber;
    a multipole high voltage power or load switch disposed in said switch chamber, said multipole switch having poles, one for each phase, disposed next to each other in a longitudinal direction and generally aligned and at most slightly offset with respect to one another with respect to a front end of said enclosure, each pole being provided with a bus connection terminal at one end and a power terminal at its other end;
    a plurality of cable terminals, one for each phase, gas tightly extending through a wall of said enclosure defining said switch chamber with each of said cable terminals being electrically connected to a respective one of the power terminals of said multipole switch; said firs bus bar system including a plurality of bus bars, one for each phase;
    a plurality of first electrical connecting means, one for each phase and disposed in said first bus bar chamber, for connecting a respective bus bar to one of a respective one of said current pins, each first electrical connecting means including a respective bus bar switch, said bus bars extending in said longitudinal direction and being spaced apart in a bus bar spacing direction perpendicular to said longitudinal direction, each said bus bar switch being connected betseen a respective one of said bus bars and one end of a respective one of said current pins; and
    respective second electrical connecting means, disposed in said switch chamber, for electrically connecting the other ends of said pins with the respective said bus connection terminals with the proper phase, the improvement wherein:
    in said first bus bar chamber, the electrical connections between the respective bus bars and the respective one ends of the respective current pins, are effected with the respective first electrical connecting means, including the bus bar switch thereof, extending in straight lines perpendicular to said bus bar spacing directions in respective mutually parallel spaced apart planes, said planes extending at least approximately at right angles to the axes of the respective bus bars,
    said passages in said first protective wall portion are staggered diagonally such that said passages and the center lines of the respective current pins therethrough are spaced in said perpendicular direction at a distance equal to the spacing between the longitudinal axes of said bus bars and are spaced in said longitudinal direction at distances equal to the center-to-center spacing of said poles of said multipole switch; and
    the respective said second electrical connecting means disposed in said switch chamber extend in said mutually parallel spaced apart planes, one for each phase.

2. A metal enclosed multi-phase high voltage switching arrangement filled with compressed gas as defined in claim 1, wherein: said enclosure and said protective walls are shaped such that said protected chambers have a cube or block shape and are provided with planar covers; said protective walls separating said protected chambers are grounded; said enclosure is provided with at least one installation opening for each of said protected chambers and means for gas-tightly closing said installation openings during operation; and said bus bars of said first bus bar system are arranged in a plane which is approximately parallel to a closest one of said planar covers for said first bus bar chamber.

3. A metal enclosed multi-phase high voltage switching arrangement filled with compressed gas as defined in claim 1, wherein: said first bus bar chamber is disposed behind said switch chamber and separated therefrom by said first protective wall portion; said bus bars in said first bus bar chamber are disposed generally opposite the bus connection terminals of said multipole switch; and a wall of said enclosure defining said switch chamber is provided with an opening with a gas-tight cover, whereby further bus bar chambers with additional bus bar systems may be electrically connected to said multipole switch in a gas-tight manner so as to expand the arrangement.

4. A metal enclosed multi-phase high voltage switching arrangement filled with compressed gas as defined in claim 3, wherein said enclosure comprises a common housing welded together of sheet metal components.

5. A metal enclosed multi-phase high voltage switching arrangement filled with compressed gas as defined in claim 3, wherein said enclosure includes:
    a sealed block shaped housing, including said first protective wall portion as one wall, defining said first bus bar chamber;
    a separate block shaped housing which is open on the side facing said protective wall portion; and
    releasable connecting means for gas-tightly connecting said separate housing to said sealed housing so that said first protective wall portion gas-tightly seals said switch chamber.

6. A metal enclosed multi-phase high voltage switching arrangement filled with compressed gas as defined in claim 5, wherein said enclosure includes:
    a first housing portion containing a portion of said switch chamber and a first one of said bus bar chambers, with said first one of said bus bar chambers being disposed behind said portion of said switch chamber and separated therefrom by its respective said protective wall portion;

a second housing portion which includes a second protective wall portion which is a second portion of said interior protective walls, said second housing portion accommodating:
a second one of said bus bar chambers,
a second one of said bus bar systems in said second one of said bus bar cambers, and
a partial volume of said switch chamber which is separated from said second one of said bus bar chambers by said second protective wall portion; and
means for gas tightly connecting said second housing portion to said first housing portion so that said partial volume is in communication with said portion of said switch chamber within said first housing portion via an opening in said first housing portion; said respective second electrical connecting means for said second bus bar system including respective conductors which extend into said partial volume.

7. A metal enclosed multi-phase high voltage switching arrangement filled with compressed gas as defined in claim 6, wherein said second housing portion includes a third protective wall portion which is a third portion of said interior protective walls, said second housing portion further accommodating a third one of said bus bar chambers and a third one of said bus bar systems in said third one of said bus bar chambers, said second and third bus bar cambers being spaced apart from each other and symmetrically configured so that said second and third protective wall portions define said partial volume therebetween; said respective second electrical connecting means for said third bus bar system includes respective further conductors which extend through said partial volume for electrically connecting said third bus bar system to said bus connection terminals.

8. A metal enclosed multi-phase high voltage switching arrangement filled with compressed gas as defined in claim 3, wherein said switch chamber has a lesser depth in a rearward direction in its region adjacent said first bus bar chamber than in its region including said cable terminals.

9. A metal enclosed multi-phase high voltage switching arrangement filled with compressed gas as defined in claim 8, wherein: said enclosure comprises a common housing for said first bus bar chamber and said switch chamber and including said first protective wall portion; and said first protective wall portion of said common housing is composed of an angled sheet metal member having a one portion which contains said passages and another portion which intersects said one portion at an angle and faces an end of said common housing.

10. A metal enclosed multi-phase high voltage switching arrangement filled with compressed gas as defined in claim 1, further comprising: drive means connected to said multipole switch for driving same; a frontal installation opening in said enclosure for said switch chamber, and cover means, on which said multipole switch and said drive means are mounted, for gastightly sealing said frontal installation opening; and wherein said bus connection terminals and said power terminals are plug-in type contacts, and respective mating plug-in type contacts are provided in said switch chamber at positions to establish electrical connection of said multi-pole switch with said bus bars and with said cable terminals when said multipole switch is installed in said switch chamber via said installation opening.

11. A metal enclosed multi-phase high voltage switching arrangement filled with compressed gas as defined in claim 1, further comprising grounded partitions subdividing said first bus bar chamber and said switch chamber by phases, said partitions having openings therein providing gaseous communication between the subdivisions of said chambers, said openings being provided at locations of said chambers which experience relatively low electrical field intensities, said partitions subdividing the first bus bar chamber lying against and being connected to one side of the first protective wall portion, and said partitions subdividing said switch chamber respectively lying against and being connected to the opposite side of the first protective wall portion, so as to reinforce the interior protective walls.

12. A metal enclosed multi-phase high voltage switching arrangement filled with compressed gas as defined in claim 1, wherein each of said bus bar switches has a movable contact which pivots in a respective pivot plane; and wherein for each phase of said first bus bar system, the axis of the respective said bus bar, the current path of the respective said bus bar switch and the centerline of the respective said bushing-type current pin define a phase plane corresponding to the phase, and said pivot plane for the respective said bus bar switch is parallel to and separated from the respective said phase plane by no more than a small distance.

13. A metal enclosed multi-phase high voltage switching arrangement filled with compressed gas as defined in claim 12, further comprising means for causing said movable contacts of said bus bar switches of the outer phases to pivot in opposite directions.

14. A metal enclosed multi-phase high voltage switching arrangement filled with compressed gas as defined in claim 1, wherein said means for causing includes: partitions subdividing said first bus bar chamber by phases; first and second shafts extending gas-tightly into said first bus bar chamber and being rotatably mounted in one of said partitions; means coupled between said first shaft and two adjacent ones of said bus bar switches, for rotating the two adjacent bus bar switches with rotation of said first shaft in a first direction; means connecting said second shaft to a third one of said bus bar switches for rotating said third bus bar switch upon rotation of said second shaft; and means, connected between said first and second shafts, for rotating said second shaft with, and in an opposite rotational direction to, rotation of said first shaft.

15. A metal enclosed multi-phase high voltage switching arrangement filled with compressed gas as defined in claim 14, wherein said means for rotating said second shaft includes a four-bar mechanism mounted on said one of said partitions; and further comprising shielding means mounted on said one of said partitions, for covering said four-bar mechanism.

16. A metal enclosed multi-phase high voltage switching arrangement filled with compressed gas as defined in claim 1, wherein said bus bars are fastened in gas-tight passages extending through side walls of said enclosure.

17. A metal enclosed multi-phase high voltage switching arrangement filled with compressed gas as defined in claim 3, wherein said cable terminals are arranged by phase in one of a triangle and a diagonally staggered arrangement with respect to said front of said enclosure.

18. A metal enclosed multi-phase high voltage switching arrangement filled with compressed gas as defined in claim 3, wherein at least two of said cable terminals are provided per phase.

19. A metal enclosed multi-phase high voltage switching arrangement filled with compressed gas as defined in claim 1, further comprising connection means, provided in said switch chamber for each phase and extending through a wall of said enclosure, for connecting a voltage transformer to said high voltage switch.

20. A metal enclosed multi-phase high voltage switching arrangement filled with compressed gas as defined in claim 3, wherein said cable terminals comprise cable sockets which are disposed above said single one of said bus bar chambers at the rear of said enclosure, with the connection axes of said sockets being arranged in one of a vertical and a horizontal connection direction.

21. A metal enclosed multi-phase high voltage switching arrangement filled with compressed gas as defined in claim 1, further comprising means for separately enclosing said switch chamber by respective phases in the region of said cable terminals.

22. A metal enclosed multi-phase high voltage switching arrangement filled with compressed gas as defined in claim 21, wherein said means for separately enclosing comprises a plurality of partitions, each having a cylindrical configuration, each surrounding a respective one of said cable terminals, and each being designed as a carrier for a secondary winding of a current transformer.

23. A metal enclosed multi-phase high voltage switching arrangement as defined in claim 1, further comprising: an additional protective wall in said switch chamber gas-tightly separating said cable terminals from a remainder of said switch chamber; and a separate installation opening in said enclosure for providing access to said cable terminals.

24. A metal enclosed multi-phase high voltage switching arrangement filled with compressed gas as defined in claim 1, wherein said multipole switch is a vacuum switch.

25. A metal enclosed multi-phase high voltage switching arrangement filled with compressed gas as defined in claim 1, wherein said compressed gas is an insulating gas which acts as a quenching agent for said multipole switch.

26. A metal enclosed multi-phase high voltage switching arrangement filled with compressed gas as defined in claim 1, wherein: each of said bus bar switches includes a stationary contact directly mounted on a respective one of said bus bars and a moving contact which is rotatably mounted on said one end of a respective one of said current pins.

27. In a metal enclosed multi-phase high voltage switching arrangement filled with compressed gas, comprising:
  a plurality of bus bar systems;
  a metal enclosure filled with compressed gas and provided with interior protective walls which partition the interior of the enclosure into a plurality of gas-tight protected chambers including a single switch chamber and respective bus bar chambers for accommodating each of said bus bar systems with each bus bar chamber having in common with said switch chamber a respective protective wall portion which is a portion of said interior protective walls;
  a plurality of gas-tight passages, one for each phase, formed in each said protective wall portion, and a respective bushing-type current pin gas tightly extending through each of said passages to provide respective electrical connections between each said bus bar chamber and said switching chamber;
  a multipole high voltage power or load switch disposed in said switch chamber, said multipole switch having poles, one for each phase, disposed next to each other in a longitudinal direction and generally aligned and at most slightly offset with respect to one another with respect to a front end of said enclosure, each pole being provided with a bus connection terminal at one end and a power terminal at its other end;
  a plurality of cable terminals, one for each phase, gas tightly extending through a wall of said enclosure defining said switch chamber with each of said cable terminals being electrically connected to a respective one of the power terminals of said multipole switch; each bus bar system including a plurality of bus bars, one for each phase;
  a plurality of first electrical connecting means, one for each phase and disposed in each said bus bar chamber, for connecting a respective bus bar to one end of a respective one of said current pins, each first electrical connecting means including a respective bus bar switch, said bus bars extending in said longitudinal direction and being spaced apart in a bus bar spacing direction perpendicular to said longitudinal direction, each said bus bar switch being connected between a respective one of said bus bars and one end of a respective one of said current pins; and
  respective second electrical connecting means, disposed in said switch chamber, for electrically connecting the other ends of said pins with the respective said bus connection terminals with the proper phase, the improvement wherein:
  in each said bus bar chamber, the electrical connections between the respective bus bars and the respective one ends of the respective current pins, are effected with the respective first electrical connecting means, including the bus bar switch thereof, extending in straight lines perpendicular to said bus bar spacing directions in respective mutually parallel spaced apart planes, said planes extending at least approximately at right angles to the axes of the respective bus bars,
  said passages in each said protective wall portion are staggered diagonally such that said passages and the center lines of the respective current pins therethrough are spaced in said perpendicular direction at a distance equal to the spacing between the longitudinal axes of said bus bars and are spaced in said longitudinal direction at distances equal to the center-to-center spacing of said poles of said multipole switch; and
  the respective said second electrical connecting means disposed in said switch chamber extend in said mutually parallel spaced apart planes, one for each phase.

28. A metal enclosed multi-phase high voltage switching arrangement filled with compressed gas as defined in claim 27, wherein: said enclosure contains said switch chamber and one of said bus chambers, with said one of said bus bar chambers being disposed behind said switch chamber and separated therefrom by the protective wall portion in common with the one of the bus bar chambers and the switch chamber; the bus bars in said one of said bus bar chambers are disposed generally opposite the bus connection terminals of said multipole switch.

* * * * *